United States Patent [19]
Barrere et al.

[11] Patent Number: 5,769,494
[45] Date of Patent: Jun. 23, 1998

[54] ARTICULATION FOR A SEAT, AND SEAT FOR A MOTOR VEHICLE EQUIPPED WITH THIS ARTICULATION

[75] Inventors: Eric Barrere; Olivier Delatte; François Fourrey; Jean Marie Blanchard; Michel di Luccio, all of Nogent-sur-Vernisson, France

[73] Assignee: Cesa-Compagnie Europenne de Sieges pour Automobiles, Levallois-Perret Cedex, France

[21] Appl. No.: 733,066

[22] Filed: Oct. 16, 1996

[30] Foreign Application Priority Data

Oct. 17, 1995 [FR] France ................................. 95 12159

[51] Int. Cl.[6] ........................................................ B60N 2/02
[52] U.S. Cl. ..................................... 297/367; 297/378.12
[58] Field of Search ........................... 297/378.1, 378.12, 297/367, 366, 354.12, 353, 354.1, 368, 369

[56] References Cited

U.S. PATENT DOCUMENTS

| | | |
|---|---|---|
| 4,076,309 | 2/1978 | Chekirda et al. . |
| 4,082,352 | 4/1978 | Bales et al. . |
| 4,997,223 | 3/1991 | Croft . |
| 5,161,856 | 11/1992 | Nishino ................................... 297/367 |
| 5,590,931 | 1/1997 | Fourrey et al. ..................... 297/367 X |
| 5,611,599 | 3/1997 | Baloche et al. .......................... 297/367 |
| 5,622,407 | 4/1997 | Yamada et al. ..................... 297/367 X |

FOREIGN PATENT DOCUMENTS

| | | |
|---|---|---|
| 24976 | 3/1981 | European Pat. Off. . |
| 691238 | 1/1996 | European Pat. Off. . |
| 2494574 | 5/1982 | France . |
| 2626154 | 7/1989 | France . |
| 2241884 | 9/1991 | United Kingdom . |

*Primary Examiner*—Milton Nelson, Jr.
*Attorney, Agent, or Firm*—Sughrue, Mion, Zinn, Macpeak & Seas, PLLC

[57] ABSTRACT

The articulation comprises two cheeks (24, 26), one of which, which is stationary, is intended to be fixed to the seat part, and the other of which, which can move, is intended to be fixed to the backrest. The cheeks (24, 26) can rotate one with respect to the other. The articulation also includes a coupling mechanism (30) for coupling the cheeks (24, 26) together, controlled by a member (32) which can be actuated in the direction for adjusting the inclination of the backrest and in the opposite direction for temporarily folding this backrest down. The coupling mechanism (30) comprise at least one lever (34*a*, 34*b*) having two ends (36A, 36B), each of which can be secured to a cheek (24, 26) by the interaction of complementary shapes (SA, SB, TA). Cam Mechanisms (44A, 44B, 52) for manoeuvring the lever secure the latter to just one of the cheeks (24, 26) or the other, depending on the direction in which the control member (32) is actuated, by tilting the lever (34*a*, 34*b*) about a fulcrum embodied by the complementary securing shapes (SA, SB, TA).

29 Claims, 5 Drawing Sheets

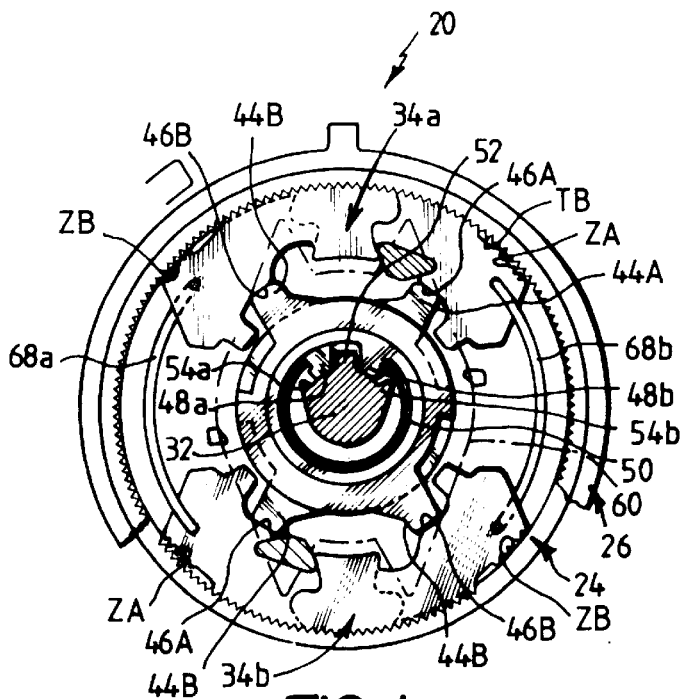
FIG. 4
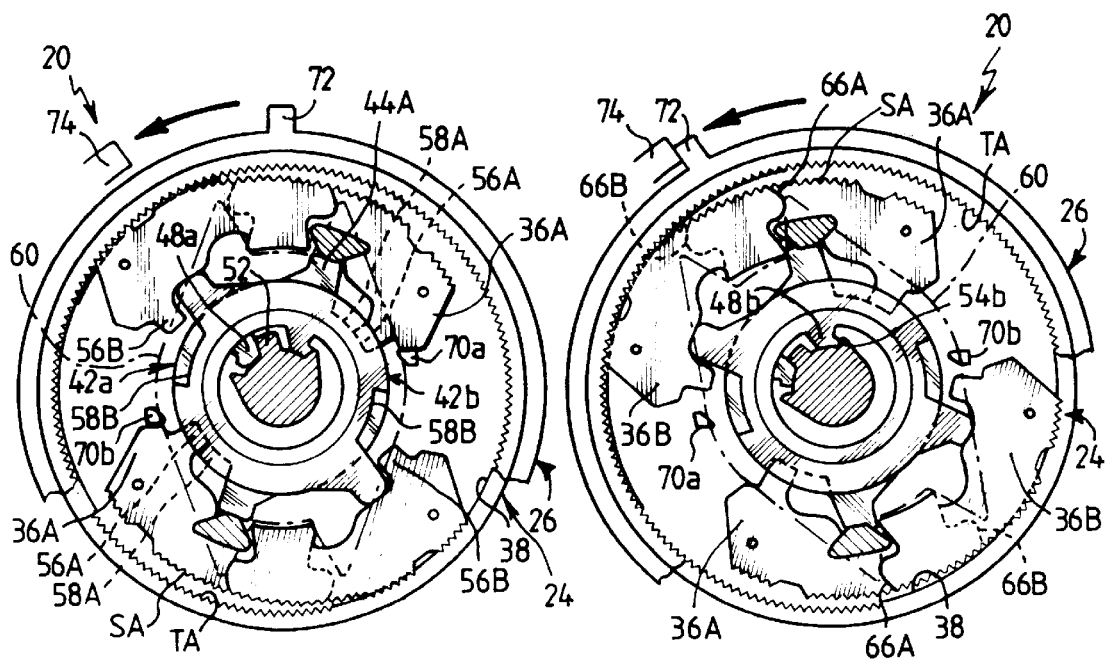
FIG. 5
FIG. 6

ARTICULATION FOR A SEAT, AND SEAT FOR A MOTOR VEHICLE EQUIPPED WITH THIS ARTICULATION

BACKGROUND OF THE INVENTION

The present invention relates to an articulation for a seat and to a seat for a vehicle equipped with this articulation.

Already known in the state of the art is an articulation for a seat, especially for a motor vehicle, of the type comprising:

two substantially parallel cheeks, one of which, which is stationary, is intended to be fixed to a seat part of the seat and the other of which, which is mobile, is intended to be fixed to a backrest of the seat, these cheeks being able to rotate one with respect to the other about an axis of articulation X which is perpendicular to them, and means for coupling the cheeks together, controlled by a member which can be actuated in a direction for adjusting the inclination of the backrest with respect to the seat part and in the opposite direction from the previous direction for temporarily folding this backrest down.

Such an articulation is described, for example, in FR-A-2,494,574.

In the case of a motor vehicle front seat equipped with an articulation of this type, commonly known as a memory articulation, it is possible to fold the backrest down onto the seat part in order to access the rear seats of the vehicle, and to raise this backrest up to a position of use, and to do this without altering the backrest inclination adjustment.

The articulation as described in the aforementioned document has a relatively large number of components which means that undesirable play can easily appear.

SUMMARY OF THE INVENTION

The object of the invention is to provide a compact and robust articulation, especially having a smaller number of components so as to avoid the appearance of undesirable play resulting from wearing of she articulation.

To this end, the subject of the invention is an articulation for a seat, especially for a motor vehicle, of the aforementioned type, characterized in that the coupling means comprise at least one lever which has two ends, each of which can be secured directly to an associated cheek by the interaction of complementary shapes, the member for controlling the coupling means actuating means for manoeuvring the lever securing the lever to just one of the flanges or the other, depending on the direction of actuation of the control member, by tilting the lever about a fulcrum embodied by the complementary shapes for securing one end of the lever or the other to its associated cheek.

According to features of various embodiments of the invention:

the manoeuvring means comprise means for securing the ends of the lever to the associated cheeks, and means for tilting the lever between a position of rest, in which the two ends of the lever are secured to the two associated cheeks in order to couple these, and two alternative tilted positions, in which one end of the lever is secured to the associated cheek so that it bears against it, and the other end is freed of this cheek so as to allow, as the case may be, the inclination of the backrest to be adjusted, or the backrest to be temporarily folded down;

the means for securing the ends of the lever comprise a rotary bearing cam associated with each end of the lever, returned elastically into contact with a bearing cam follower integral with the end of the lever so as to keep this end secured to the associated cheek, and the means for tilting the lever comprise means for disengaging the bearing cam associated with the end to be freed of the lever, opposing the elastic return force of this bearing cam, and means for pushing the bearing end of the lever;

each end of the lever comprises a tilt-limiting stop intended to interact with a complementary stop integral with a bearing cam;

the means for pushing a bearing end of the lever comprise the bearing cam associated with this bearing end interacting with the bearing cam follower integral with this same end;

the means for pushing a bearing end of the lever comprise a pushing cam integral with the bearing cam associated with the end to be freed of the lever, interacting with a pushing cam follower integral with the bearing end of the lever;

each end of the lever includes a cam for angularly offsetting the bearing cam associated with the other end of the lever in the direction for disengaging this bearing cam, this angular-offsetting cam interacting with an angular-offsetting cam follower integral with this bearing cam when the end of the lever is freed from its associated cheek;

the lever has the overall shape of an arc extending substantially parallel to the cheeks, the ends of the lever being offset from one another parallel to the axis of articulation X, the complementary securing shapes being made on the exterior contours of the lever and on the interior contours of peripheral shoulders made in the cheeks and offset one with respect to the other parallel to the axis of articulation X, the bearing cams are delimited by bosses made on the exterior contour of rotary rings associated with each end of the lever, centred substantially on the axis of articulation X and superimposed along this axis, the bearing cam followers being made on the interior contour of the lever, and the means for disengaging the bearing cams comprise a disengaging cam mounted so that it can rotate around the axis of articulation X and intended to interact selectively with two disengaging cam followers made on the internal contour of the two rings respectively, the disengaging cam being interposed between the disengaging cam followers, preferably with angular clearance on each side of this cam;

the tilt-limiting stop associated with one end of the lever is integral with the bearing cam associated with this end of the lever, and the tilt-limiting stops are delimited by end bosses made on the interior contour of the lever and the complementary tilt-limiting stops are delimited by cutouts made on the exterior contour of the rings;

the complementary tilt-limiting stop associated with one end of the lever is integral with the bearing cam associated with the other end of the lever, the tilt-limiting stops are delimited by fingers borne by legs extending the ends of the levers substantially radially inwards, and the complementary tilt-limiting stops are delimited by cutouts made on the exterior contour of the rings, each finger extending parallel to the axis of articulation X so as to take up the axial offset between the end of the lever bearing it and the other end of this lever, and the pushing cams are delimited by bosses made on the exterior contour of the rings and the pushing cam followers are delimited by the axial fingers;

the angular-offsetting cams are delimited by portions of the contour of the axial fingers forming ramps, and the angular-offsetting cam followers are delimited by portions of the contour of the tilt-limiting cutouts forming ramps which complement the previous ones;

the disengaging cam followers are delimited by studs for catching on an angular-action return spring urging the rings in opposite directions towards positions in which the bearing cams and bearing cam followers interact;

the means for pushing a bearing end of the lever additionally comprise cams for the offset driving of the rings, integral with the disengaging cam, extending angularly on each side of this disengaging cam so that each disengaging cam follower extends between the disengaging cam and an offset-driving cam with an angular clearance which, as the disengaging cam and driving cam are rotated, allows offset driving of the disengaging cam followers which first of all causes the disengagement of the bearing cam associated with the end to be freed of the lever, then causes the bearing end of the lever to be pushed;

the cheeks and the rings are centred with respect to each other by complementary circular shoulders made in these elements, substantially coaxial with the axis of articulation X;

a spacing member is interposed between the rings;

the complementary shapes for securing the ends of the lever to the cheeks comprise complementary toothings;

each end of the lever comprises a toothed securing sector, the toothed sector of a first end of the lever being intended to interact with a toothed sector of like angle of the stationary cheek, and the toothed sector of the second end of the lever being intended to interact with a toothed sector of larger angle of the mobile cheek;

the toothed sector of the mobile cheek forms an annulus gear;

the opposite ends of the toothed sectors of the lever comprise toothed regions for reinforcing the bearing of the lever, one or other of these regions interacting with the toothed sector of the associated cheek only when the lever is in one of two tilted positions or the other;

the coupling means comprise two levers;

the levers together with their manoeuvring means are, in general, symmetric with respect to the axis of articulation X;

the more closely adjacent ends of the levers are joined together by elastic pins urging these ends into the position in which they are secured to the associated cheeks;

the spacing member also forms a member for synchronizing the levers and for that purpose comprises two diametrically opposed end forks intended to interact with shoulders for the axial offsetting of the ends of the levers and with the interior contour of the levers when the latter are tilted;

the cheeks have the overall shape of a circle and are centred one with respect to the other by complementary peripheral shoulders coaxial with the axis of articulation X;

the articulation comprises means for limiting the travel for adjusting the inclination of the backrest, and means for limiting the travel for temporarily folding the backrest down;

the means for limiting the travel for adjusting the inclination of the backrest comprise a backrest inclination limiting stop integral with the mobile cheek intended to interact with two complementary end-of-travel stops delimited, one by a shoulder for axial offsetting of the two ends of a first lever, and the other by the end of the second lever associated with the mobile cheek;

the means for limiting the travel for temporarily folding the backrest down comprise a first end-of-travel stop integral with the stationary cheek, intended to interact with that end of the lever which is associated with this stationary cheek, and a second end-of-travel stop integral with the mobile cheek and intended to interact with a complementary stationary stop;

on each ring, a cutout forming a complementary stop limiting the tilting of the lever is filled in with the purpose of preventing this lever from tilting into its position which allows the backrest to be folded down temporarily.

Another subject of the invention is a seat for a vehicle equipped with at least one articulation as defined hereinabove.

The invention will be better understood from reading the description which will follow, given solely by way of example and made with reference to the attached drawings in which:

BRIEF DESCRIPTION OF THE DRAWINGS

FIG. 4 is a front-on view of the articulation represented in FIG. 2, with the mobile cheek cut away to give visual access to the inside of the articulation;

FIGS. 5 and 6 are views which are similar to FIG. 4 in two successive configurations of the articulation during a manoeuvre for temporarily folding the backrest down;

DESCRIPTION OF PREFERRED EMBODIMENTS

Figure 1:
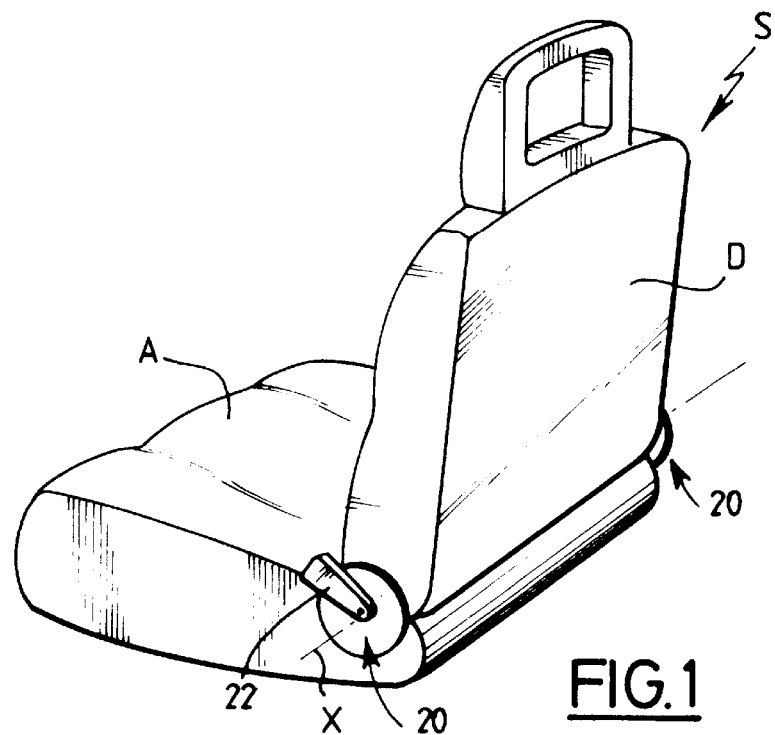
FIG. 1 is a view in perspective of a seat for a motor vehicle equipped with at least one articulation according to the invention.

FIG. 1 represents a seat S for a motor vehicle including a backrest D connected to a seat part A by two articulations 20 according to the invention.

Each articulation 20 is the mirror image of the other articulation.

The articulations 20 are preferably controlled by a knob 22 common to these two articulations.

Figure 2:
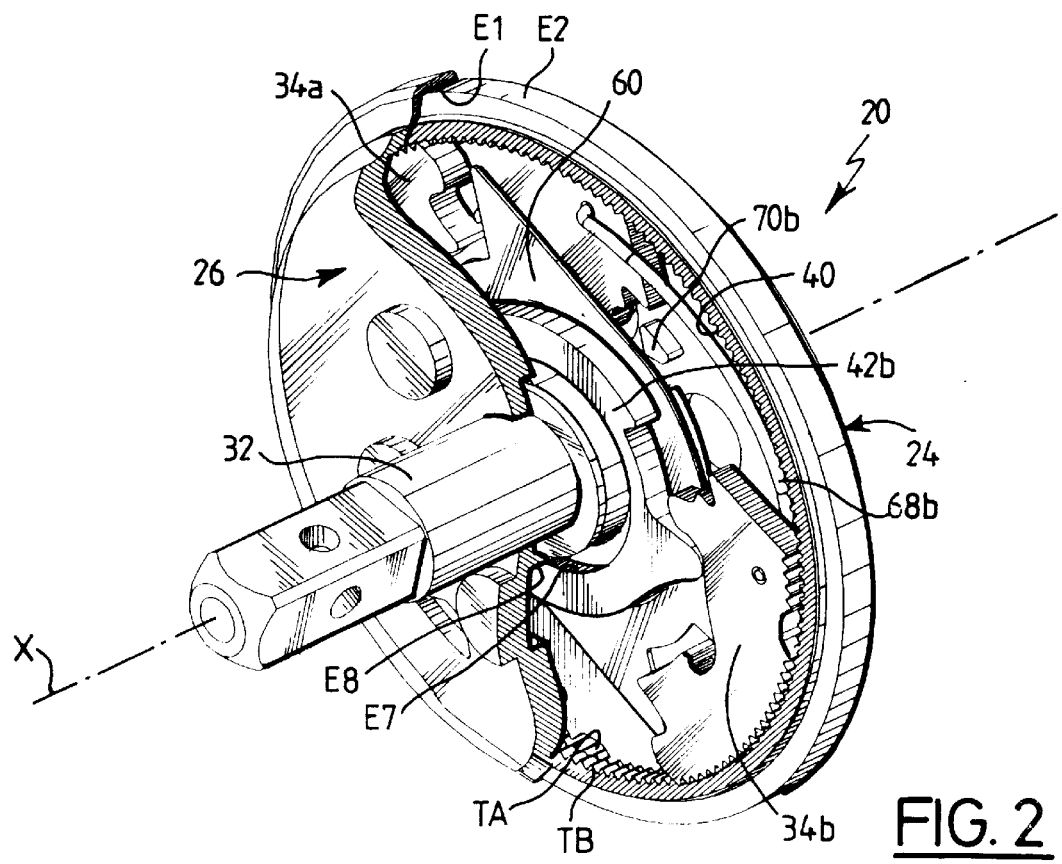
FIG. 2 is a view in perspective of an articulation for a seat according to a first embodiment of the invention.
Figure 3:
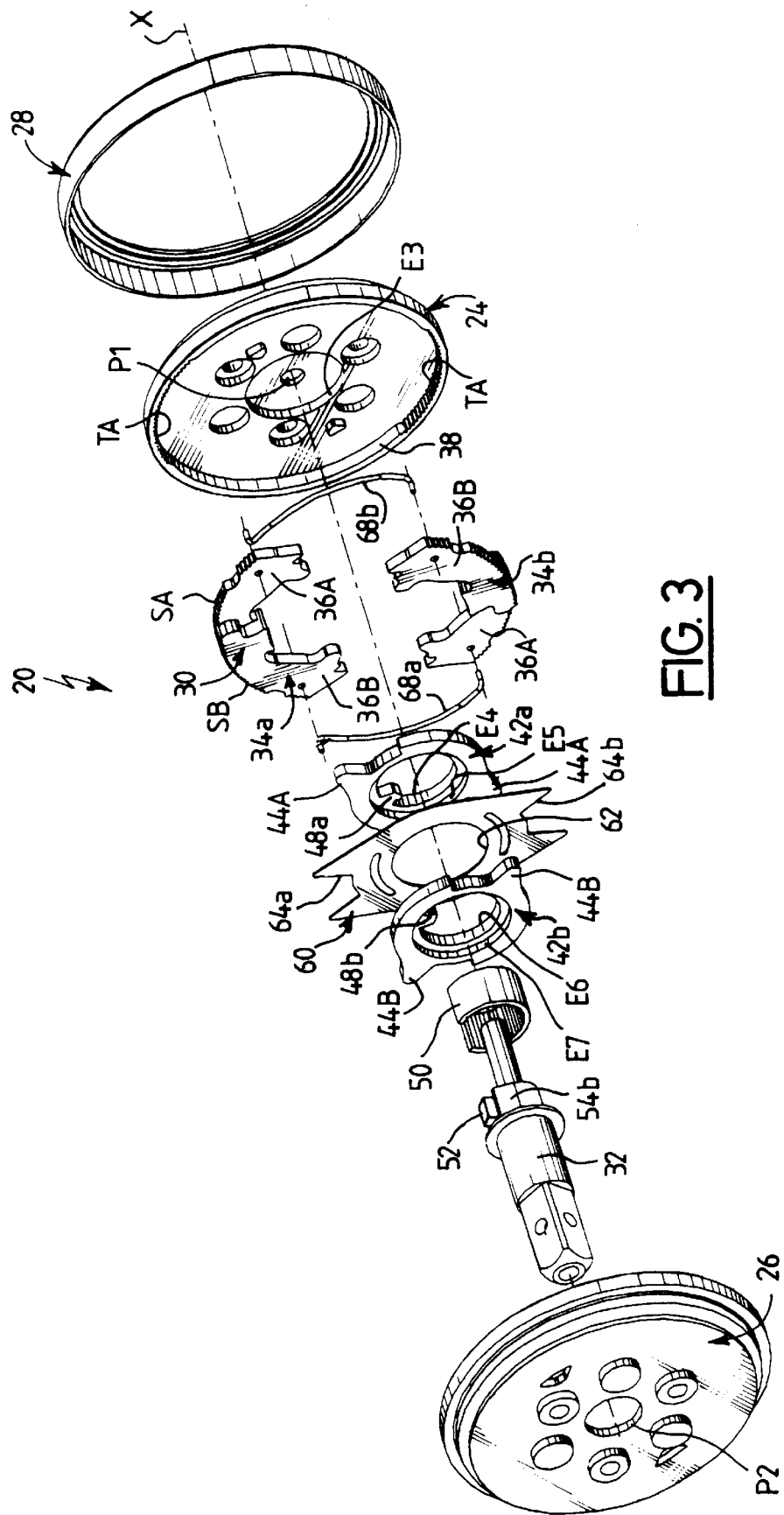
FIG. 3 is an exploded view of the articulation represented in FIG. 2.

Referring especially to FIGS. 2 and 3, in which an articulation 20 is represented in greater detail, it may be seen that this articulation includes two cheeks 24, 26 of circular overall shape, one, which is stationary, being fixed to the seat part A and the other, which is mobile, being fixed to the backrest D.

The cheeks 24, 26 are mounted so that they can rotate one with respect to the other about an axis of articulation X which is perpendicular to them, and are held against one another in a way known per se by means of a connecting ring 28.

The cheeks 24, 26 are centred one with respect to the other by complementary peripheral shoulders E1, E2 coaxial with the axis of articulation X.

The cheeks 24, 26 delimit between them a housing for means 30 of coupling these cheeks. These means 30 are controlled by a member 32 forming a spindle on which the control knob 22 is fixed in a way known per se.

The control member 32 is mounted so that it can rotate about the axis of articulation X, being borne, for example, by bearings P1, P2 made in the cheeks 24, 26.

The control member 32 can be actuated via the knob 22 in two opposite directions, namely in a clockwise direction for adjusting the inclination of the backrest with respect to the seat part, and an anticlockwise direction for folding this backrest down.

The members 32 for controlling the two articulations 20 are joined together by a conventional coupling device.

The coupling means 30 comprise two levers 34a, 34b in the overall shape of arcs extending substantially parallel to the cheeks 24, 26. These levers 34a, 34b are symmetric with respect to the axis of articulation X and are identical.

Each lever 34a, 34b has two ends 36A, 36B, each of which can be secured directly to an associated cheek 24, 26 by interaction of complementary shapes delimited, for preference, by complementary toothings.

The ends 36A, 36B of each lever 34a, 34b are offset one with respect to the other, parallel to the axis of articulation X.

The ends of the levers each include a toothed sector SA, SB for securing, made on the exterior contour of the levers. As a preference, the toothed sectors SA, SB include a common part in a central region of the levers where thickness is a maximum.

The toothed sectors SA of the first ends 36A of the levers are intended to interact with toothed sectors TA of like angle made on the interior contour of a peripheral shoulder 38 of the stationary cheek 24, visible especially in FIG. 3.

The toothed sectors SB of the second ends 36B of the levers are intended to interact with a toothed sector TB of larger angle made on the interior contour of a peripheral shoulder 40 of the mobile cheek, visible especially in FIG. 2. As a preference, this toothed sector TB forms an annulus gear.

It will be noted that the peripheral shoulders 38, 40 made in the cheeks 24, 26 are offset one with respect to the other parallel to the axis of articulation X.

The control member 32 actuates means of manoeuvring the levers 34a, 34b which will be described hereinbelow. These manoeuvring means are, in general, symmetric with respect to the axis of articulation X.

The manoeuvring means secure each lever 34a, 34b to just one of the cheeks 24, 26 or the other, depending on the direction of rotation of the control member 32, by tilting the lever 34a, 34b about a fulcrum embodied by the complementary toothings of one or other end 36A, 36B of the lever and of its associated cheek 24, 26.

Figure 8:
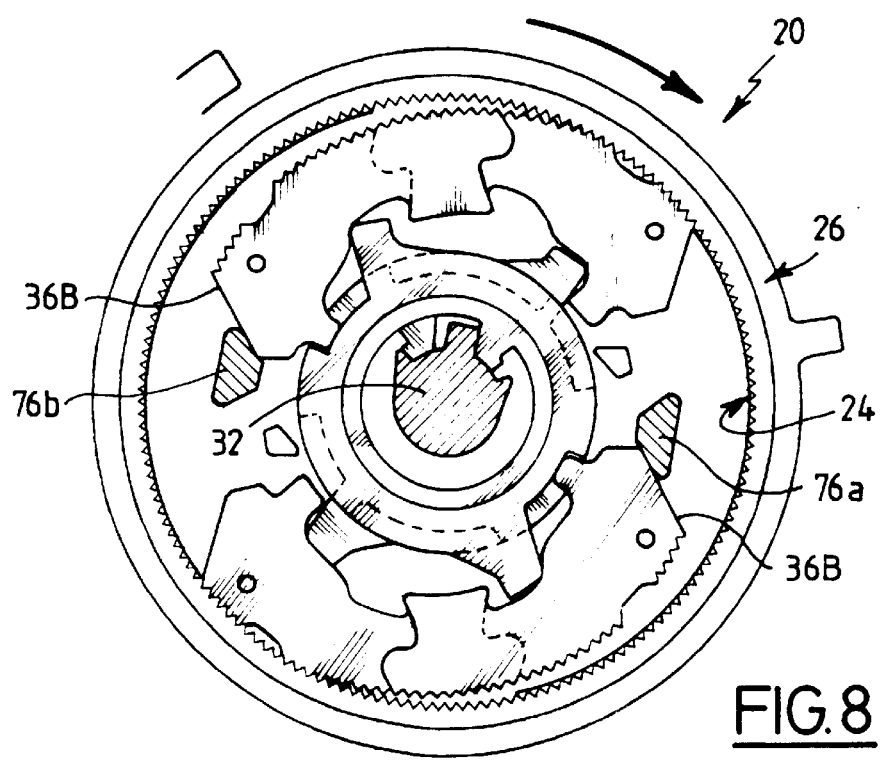

The manoeuvring means comprise means for securing the ends 36A, 36B of the levers to the associated cheeks 24, 26 and means for tilting the levers between a position of rest, as represented in FIG. 4, and two alternative tilted positions, as represented in FIGS. 6 and 8.

When a lever is in the position of rest, the two ends 36A, 36B thereof are meshed in the corresponding toothings of the associated cheeks so as to couple these and thus immobilize the backrest with respect to the seat part.

When a lever 34a, 34b is in one of its alternative tilted positions, one end 36A, 36B of this lever is meshed in the corresponding toothing TA, TB of the associated cheek 24, 26 so as to bear against this toothing, and the other end 36B, 36A of this lever is freed from this same cheek 24, 26 so as to allow, as the case may be, the inclination of the backrest to be adjusted, or the backrest to be folded down temporarily.

The means of securing the ends 36A, 36B of the levers to the associated cheeks 24, 26 comprise two rotary rings 42a, 42b centred substantially on the axis of articulation X and superposed along this axis.

The cheeks 24, 26 and the rings 42a, 42b are centred with respect to one another, possibly with clearance, by complementary circular shoulders E3 to E8 made in these elements, these being substantially coaxial with the axis of articulation X (see FIGS. 2 and 3).

Each ring 42a, 42b comprises a pair of diametrically opposed bearing cams 44A, 44B, delimited by bosses made on the exterior contour of the ring.

The bearing cams 44A (and 44B respectively) of a first ring 42a (and of the second ring 42b respectively) are associated with first ends 36A of the levers (and the second ends 36B respectively) which is symmetric with respect to the axis of articulation X.

The bearing cams 44A, 44B are intended to interact with bearing cam followers 46A, 46B made on the interior contour of the ends 36A, 36B of the levers, with which ends they are associated in order to keep these ends in mesh with the toothings of the cheeks 24, 26.

The rings 42a, 42b each comprise a stud 48a, 48b made on their interior contour, intended to catch on an angularly-acting return spring 50 urging the rings in opposite directions towards the positions in which the bearing cams and bearing cam followers interact.

The spring 50 consists, for example, of a split ring, the axial edges of which are caught on the studs 48a, 48b.

It will be noted that for reasons of clarity the spring 50 is not represented in FIGS. 5 to 8.

The spring 50 plays a part in centring the rings 42a, 42b and may possibly replace the shoulders E4 to E7 for the centering of these rings.

The means of tilting the levers 34a, 34b comprise means for disengaging the bearing cams associated with the ends to be freed of the levers, opposing the elastic return force of these bearing cams, and means for pushing the bearing ends of the levers.

The means for disengaging the bearing cams comprise a disengaging cam 52 integral with the control member 32, intended to interact selectively with the two studs 48a, 48b forming disengaging cam followers, between which studs this disengaging cam 52 is interposed, preferably with angular clearance on each side of this cam 52.

This angular clearance makes it possible to get around the mechanical tolerances on the device for coupling the control members 32 of the two articulations 20 whilst allowing good synchronization of the coupling and of the uncoupling of the cheeks 24, 26 of the two articulations.

As will emerge more clearly from the description of the operation of the articulation which is given hereafter, the means for pushing a bearing end of a lever comprise, in this first embodiment of the invention, the bearing cam 44A, 44B associated with this bearing end interacting with the bearing cam follower 46A, 46B integral with this same end.

The pushing means also comprise cams 54a, 54b for the offset driving of the rings, these being integral with the control member 32 and extending angularly on each side of the disengaging cam 52 so that each stud 48a, 48b extends between the disengaging cam 52 and a driving cam 54a, 54b with angular clearance.

This angular clearance makes it possible, when the control member 32 is rotated, to have offset driving of a first then of a second stud 48a, 48b thus first of all causing disengagement of the bearing cams 44A, 44B associated with the ends 36A, 36B to be freed of the levers, then causing the bearing ends 36B, 36A of these levers to be pushed.

Each end 36A, 36B of the levers includes a tilt-limiting stop 56A, 56B delimited by an end boss made on the interior contour of this end, and intended to interact with a complementary stop delimited by a cutout 58A, 58B made on the exterior contour of the ring 48a, 48b bearing the bearing cam 44A, 44B associated with the end of the lever.

Thus it will be noted that the complementary stop for limiting the tilting of a lever, associated with one end of this lever, is integral with the bearing cam associated with this end of the lever.

Referring to FIG. 3, it may be seen that a spacing member 60 is interposed between the rings 42a, 42b. This member 60 prevents one ring 42a, 42b from interacting with an end 36A, 36B of the levers with which it is not associated.

The spacing member 60 is made, for example, from a thin metal sheet and has a circular central centering orifice 62 intended to interact with a centring shoulder of one of the rings 42a, 42b.

Figure 7:
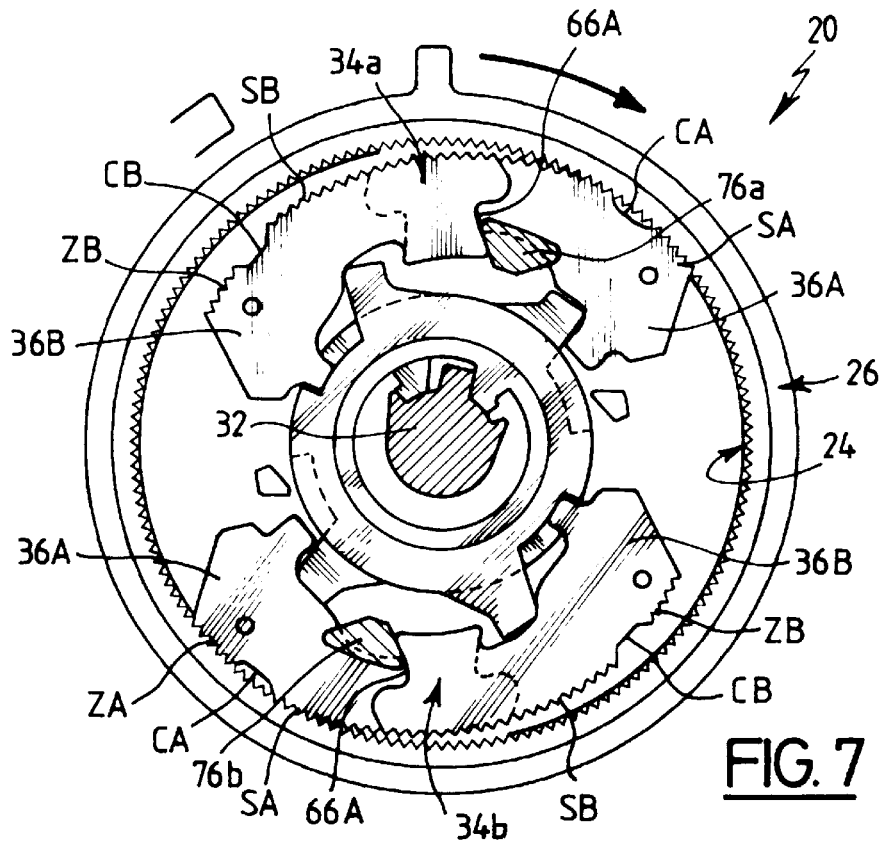
FIGS. 7 and 8 are views similar to FIG. 4, on a slightly enlarged scale, in two successive configurations of the articulation during a manoeuvre for adjusting the inclination of the backrest.

For reasons of clarity, the spacing member 60 is represented in chain line in FIGS. 4 to 6 and is not represented in FIGS. 7 and 8.

The spacing member 60 also forms a member for synchronizing the movement of the levers 34a, 34b and for this purpose comprises two diametrically opposed end forks 64a, 64b which are intended to interact with shoulders 66A, 66B for axially offsetting the ends 36A, 36B of the levers and with the interior contour of these levers when these are tilted (see FIG. 6 especially).

Thus, as the levers 34a, 34b are tilted, each fork 64a, 64b of the member 60 is in three-point contact with the corresponding lever so as to form a non-deformable lever/synchronizing member assembly at that moment.

Referring to FIGS. 3 and 4, it may be seen that the most closely adjacent ends 36A, 36B of the levers are joined together by elastic pins 68a, 68b forming springs, urging these ends into the position for meshing with the associated cheeks 24, 26.

For reasons of clarity, the pins 68a, 68b have not been represented in FIGS. 5 to 8.

The articulation 20 comprises means for limiting the travel for the adjustment of the inclination of the backrest and means for limiting the travel of temporarily folding the backrest down, which means are represented especially in FIGS. 4 to 8.

The means for limiting the travel of temporarily folding the backrest down comprise a first end-of-travel stop 70a, 70b associated with each lever 34a, 34b, integral with the stationary cheek 24 and intended to interact with the ends 36A of the levers intended to mesh with the stationary flange 24 (see especially FIG. 5).

The means for limiting the folding-down travel also comprise a second end-of-travel stop 72 delimited by a boss formed on the exterior contour of the mobile cheek 26 and intended to interact with a complementary end-of-travel stop 74 which is stationary and which is arranged on the outside of the cheeks 24, 26 (see especially FIGS. 5 and 6).

The means for limiting the travel for adjusting the inclination of the backrest comprise two diametrically opposed backrest inclination limit stops 76a, 76b, integral with the mobile cheek 26. Each of these stops 76a, 76b is intended to interact with two complementary end-of-travel stops delimited, in the case of one of them, by a shoulder 66A for axially offsetting the two ends of a first lever 34a, 34b, and in the case of the other, by that end 36B of the second lever 34b, 34a which is intended to mesh with the mobile cheek 26 (see especially FIGS. 7 and 8).

The opposite ends of the two toothed sectors SA, SB of a lever 34a, 34b comprise toothed regions ZA, ZB for reinforcing the bearing of the lever. One or other of these regions ZA, ZB meshes with the toothed sector TA, TB of the associated cheek 24, 26 only when the levers are-in one of their two tilted positions or the other (see especially FIGS. 4 and 7).

The bearing reinforcing regions ZA, ZB are separated from the rest of the toothed sectors SA, SB by smooth cutouts CA, CB.

The teeth delimiting the furthest ends of the smooth cutouts CA, CB from the regions ZA, ZB embody, together with complementary teeth of the associated cheeks, fulcrums about which the levers 34a, 34b can tilt.

Of course, the toothed regions ZA, ZB are optional but advantageously reinforce the bearing of the levers 34a, 34b when these are in their tilted positions. The toothed regions ZA, ZB thus play a part in optimizing the robustness of the articulation.

The operation of the articulation 20 will now be described with reference to FIGS. 4 to 8.

In these figures, the stationary cheek 24 is represented behind the mobile cheek 26, the latter being partially cut away.

Initially, the articulation 20 is at rest in the configuration illustrated in FIG. 4.

The levers 34a, 34b are in the position of rest, the spring 50 and the pins 68a, 68b urge the bearing cams 44A, 44B into contact with the cam followers 46A, 46B so that the levers 34a, 34b mesh with the two cheeks 24, 26 at the same time. These cheeks are thus coupled together and the seat backrest is immobilized in the normal position of use.

In order to fold the backrest down temporarily, the knob 22 is actuated so as to drive the control member 32 in the anticlockwise direction represented by an arrow in FIGS. 5 and 6.

The disengaging cam 52 thus drives the lower ring 42a by means of its stud 48a, so as to disengage the bearing cams 44A from the lower ends 36A of the levers. Then the driving cam 54B drives the upper ring 42b via its stud 48b so as to push the upper ends 36B of the levers to bear against the mobile cheek 26, via the bearing cams 44B of the upper ring 42b. The lower ends 36A of the levers are thus freed from the stationary cheek 24 and the upper ends 36B of these levers are secured to the mobile cheek 26.

It will be noted that the moment the lower ends 36A of the levers are freed, these are in contact with the stops 70a, 70b in order to prevent the backrest from moving in the clockwise direction (see FIG. 5).

By continuing to rotate the control member 32 in the clockwise direction, the mobile cheek 26 is driven in the same direction via the upper ring 42b driving the levers coupled only to this mobile cheek.

The backrest can thus be folded down until the articulation 20 is in the configuration represented in FIG. 6 imposed by the complementary stops 72, 74 in mutual contact.

It will be noted that in the configurations of the articulation 20 which are represented in FIGS. 5 and 6, the cams 56A limiting the tilting of the levers are engaged in the cutouts 58A of the lower ring 42a.

In the course of the movement of folding the backrest down, it is possible to let go of the knob 22. The lower ends 36A of the levers are then urged elastically by the spring 50 and the pins 68a, 68b into contact with the interior contour of the peripheral shoulder 38 of the stationary cheek. However, as this contour is smooth outside of the toothed sectors TA, the toothed sectors SA of the lower ends 36A of the levers slide over this contour and mesh with the stationary cheek 24 only when the backrest has returned to its normal position of use. This is because in this position the complementary toothed sectors SA and TA coincide and can mesh together.

Given that in the course of folding down the backrest the relative position of the levers and of the mobile cheek does not alter, it being possible for the levers to be coupled with the stationary cheek only when they are in a unique position imposed by the toothed sectors TA of this cheek, the adjustment of the backrest with respect to the seat part is unchanged.

In order to adjust the inclination of the backrest with respect to the seat part, the knob 22 is actuated in the opposite direction to the previous case, so as to drive the control member 32 in the clockwise direction represented by an arrow in FIGS. 7 and 8.

In this case, rotating the control member 32 makes it possible, in a way similar to the previous case, to secure the lower ends 36A of the levers to the stationary cheek 24 and to free the upper ends 36B of these levers from the mobile cheek 26.

The mobile cheek 26 can therefore turn freely as may the backrest to which it is fixed which makes it possible to move the backrest to give it the desired inclination. Moving the backrest alters the relative position of the levers and of the mobile cheek.

The backrest is immobilized in the selected position by letting go of the handle 22, which has the effect of returning the articulation 20 to its configuration as represented in FIG. 4 under the effect of the elastic return forces of the spring 50 and of the pins 68a, 68b.

The adjustment on the inclination of the backrest is limited by the two extreme configurations of the articulation 20 which are represented, on the one hand, in FIG. 7 which represents the backrest-inclination limit stops 76a, 76b in contact with the shoulders 66A and on the other hand, in FIG. 8 which represents these same stops 76a, 76b in contact with the upper ends 36B of the levers.

Figure 9:
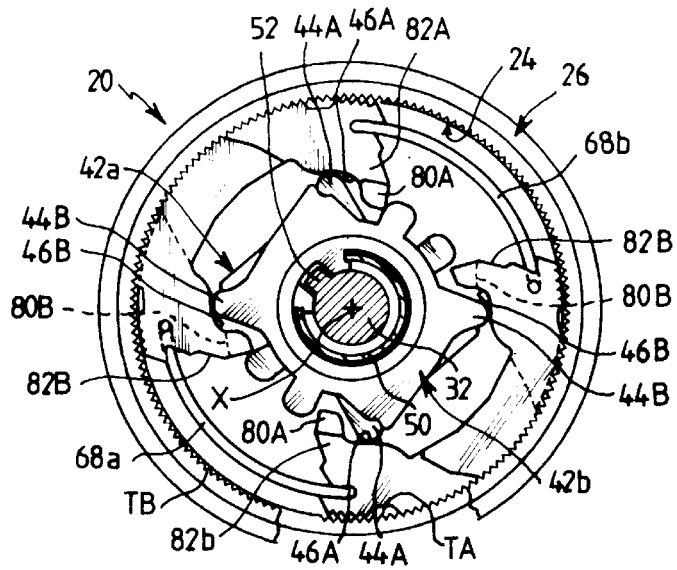
FIG. 9 is a view similar to FIG. 4 of an articulation according to a second embodiment of the invention.
Figure 10:
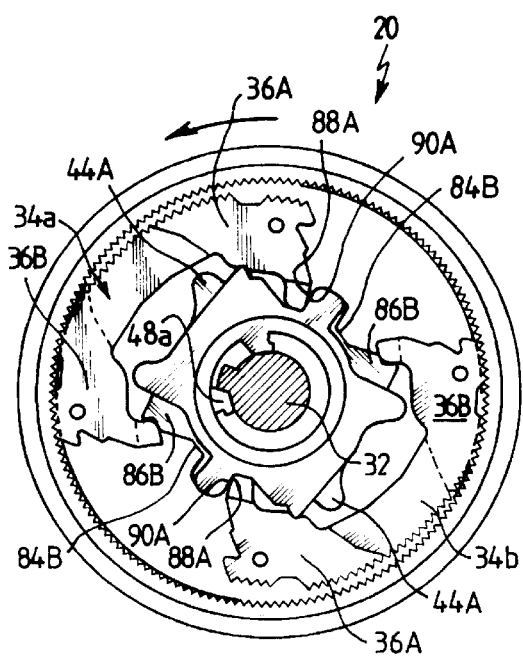
FIGS. 10 and 11 are views which are similar to FIGS. 5 and 7 respectively of the articulation according to the second embodiment.
Figure 11:
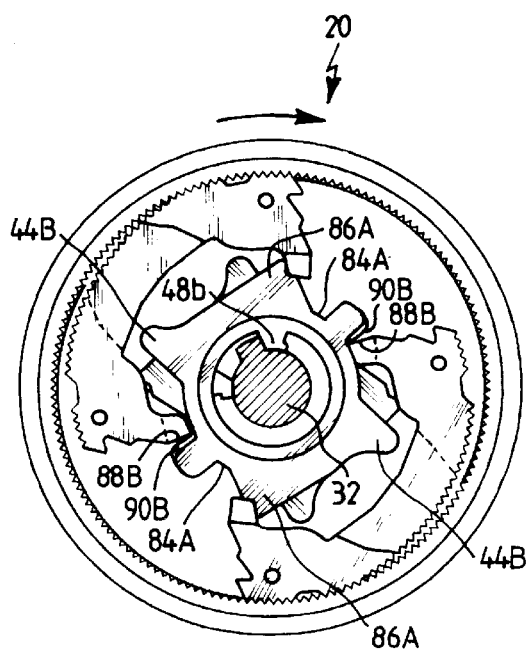

An articulation 20 according to a second embodiment of the invention is represented in FIGS. 9 to 11.

In these figures, the elements which are similar to those of the preceding figures are denoted by identical references.

For reasons of clarity, the means for limiting the travel for adjusting the inclination of the backrest and the means for limiting the travel for temporarily folding the backrest down have not been represented in these figures.

For the same reasons, the spring 50 and the pins 68a, 68b are not represented in FIGS. 10 and 11.

In this case, the complementary stop for limiting the tilting of a lever, which is associated with one end of this lever, is integral with the bearing cam associated with the other end of the lever.

In effect, the tilt-limiting stops are delimited by fingers 80A, 80B borne by legs 82A, 82B extending the ends 36A, 36B of the levers substantially radially inwards.

Each finger 80A, 80B extends parallel to the axis of articulation X so as to take up the axial offset between the ends 36A, 36B of the lever bearing it and the other end 36B, 36A of this lever.

The complementary stops for limiting the tilting of the levers are delimited by cutouts 84A, 84B made in the exterior contour of the rings 42a, 42b (see especially FIGS. 10 and 11).

In this second embodiment of the invention, the means for pushing a bearing end 36A, 36B of a lever comprise a pushing cam 86A, 86B delimited by a boss made on the exterior contour of the ring 42b, 42a bearing the bearing cam 44B, 44A associated with the end 36B, 36A to be freed of the lever.

Each pushing cam 86A, 86B is intended to interact with a pushing cam follower delimited by the axial finger 80A, 80B integral with that bearing end of the lever which is associated with the pushing cam.

In order to make it easier to return the levers 42a, 42b to the position of rest from their alternative tilted positions, each end 36A, 36B of a lever includes a cam 88A, 88B for angularly offsetting the bearing cam 44B, 44A associated with the other end 36B, 36A of the lever in the direction for disengaging this bearing cam 44B, 44A.

Each angular-offsetting cam 88A, 88B associated with a first end 36A, 36B of the lever is intended to interact with an angular-offsetting cam follower 90A, 90B integral with the bearing cam 44B, 44A associated with the second end 36B, 36A of the lever, when the first end 36A, 36B of this lever is freed from its associated cheek.

The angular-offsetting cams 88A, 88B are delimited by portions of the contour of the axial fingers 80A, 80B forming ramps, and the angular-offsetting cam followers 90A, 90B are delimited by portions of the contour of the cutouts 84A, 84B limiting the tilting of the levers, forming ramps which complement the previous ones (see especially FIGS. 10 and 11).

It will be noted that the offset-driving cams 54a, 54b integral with the control member 32 are no longer required in the second embodiment of the articulation.

The articulation 20 according to the second embodiment includes a spacing member, not represented, interposed between the rings 42a, 42b.

This spacing member includes, for example, a ring of spring steel sheet having an axial elastic effect making it possible to keep the rings apart while urging them against the respective cheeks.

It will be noted that it is not necessary in this second embodiment of the articulation to provide a member for synchronizing the movement of the levers.

The operation of the articulation 20 according to the second embodiment displays numerous similarities with that of the articulation according to the first embodiment.

However, the following specified differences will be noted by taking, for example, a manoeuvre of temporarily folding the backrest down (see FIG. 10).

When the control member 32 is turned in the anticlockwise direction indicated by an arrow in FIG. 10, the disengaging cam 52 drives the lower ring 42a in this same direction.

The rotation of this ring 42a first of all causes the disengagement of the bearing cams 44A and the freeing of the lower ends 36A of the levers, then causes the cams 86B for pushing of this lower ring to interact with the fingers 80A, 80B of the upper ends 36B of the levers bearing against the mobile cheek 26 in order to tilt the levers.

The mobile cheek can thus turn freely in order to allow the backrest to be folded down, the levers being secured to this cheek.

Freeing the lower ends 36A of the levers causes a slight rotation of the upper ring 42b in the clockwise direction through the interaction of the angular-off-setting ramps 88A associated with these lower ends 36A, with the complementary ramps 90A of the upper ring 42b.

This slight rotation makes it easier for the levers to return to the position of rest.

The operation of the articulation 20 according to the second embodiment in the case of an adjustment of the inclination of the backrest is illustrated in FIG. 11 and can be deduced mutatis mutandis from the operation described earlier for the case of the folding-down of the backrest.

The invention is not limited to the embodiments illustrated in the Figures.

In particular, the seat according to the invention may be equipped with a single articulation like the one described previously.

The articulation according to the invention may have just one lever for coupling the cheeks.

The articulation illustrated in the figures has cheeks equipped with concave internal toothings and levers equipped with convex external toothings. Of course it is possible to produce an articulation having cheeks equipped with convex external toothings and levers equipped with concave internal toothings without departing from the scope of the invention.

The invention has numerous advantages.

In an articulation according to the invention, the loadings are transmitted from one cheek to another directly by the toothed coupling levers, and this reduces the causes of play by comparison with conventional articulations.

If the function of temporarily folding down the backrest is not desired, the articulation according to the invention need be modified only slightly in order to prevent this folding down.

In effect, by filling in a lever-tilt-limiting cutout 58A or 84A of each ring, the tilting of the levers into their position which allows the backrest to be folded down temporarily is prevented.

What is claimed is:

1. An articulation for a seat, especially for a motor vehicle, comprising:

two substantially parallel cheeks (24, 26), one of which, which is stationary, is intended to be fixed to a seat part of the seat and the other of which, which is mobile, is intended to be fixed to a backrest of the seat, these cheeks being able to rotate one with respect to the other about an axis of articulation (X) which is perpendicular to them, and means (30) for coupling the cheeks (24, 26) together, controlled by a member (32) which can be actuated in a direction for adjusting the inclination of the backrest with respect to the seat part and in the opposite direction from the previous direction for temporarily folding this backrest down, wherein:

the coupling means (30) comprise at least one lever (34a, 34b) which has two ends (36A, 36B), each of which can be secured directly to an associated cheek (24, 26) by interaction of complementary shapes (SA, SB, TA, TB), the member (32) for controlling the coupling means actuating maneuvering means (44A, 44B, 52; 86A, 86B) intended to secure the lever to just one of the cheeks (24, 26) or the other, depending on the direction of actuation of the control member (32), by tilting the lever (34a, 34b) about a fulcrum embodied by the complementary shapes (SA, SB, TA, TB) for securing one end (36A, 36B) of the lever or the other to its associated cheek (24, 26).

2. The articulation as claimed in claim 1, wherein the complementary shapes (SA, SB, TA, TB) for securing the ends (36A, 36B) of the lever to the cheeks (24, 26) comprise complementary toothings.

3. The articulation as claimed in claim 1, wherein the cheeks (24, 26) have the overall shape of a circle and are centered one with respect to the other by complementary peripheral shoulders (E1, E2) coaxial with the axis of articulation (X).

4. A seat for a motor vehicle comprising at least one articulation (20) according to claim 1.

5. The articulation as claimed in claim 1, which comprises means (76a, 76b) for limiting travel for adjusting the inclination of the backrest, and means (70a, 70b, 72) for limiting travel for temporarily folding the backrest down.

6. The articulation as claimed in claim 5, wherein the means for limiting the travel for temporarily folding the backrest down comprise a first end-of-travel stop (70a, 70b) integral with the stationary cheek (24), intended to interact with that end (36A) of the lever which is associated with this stationary cheek, and a second end-of-travel stop (72) integral with the mobile cheek (26) and intended to interact with a complementary stationary stop (74).

7. The articulation as claimed in claim 1, wherein the coupling means comprise two levers (34a, 34b).

8. The articulation as claimed in claim 7, wherein the levers together with their maneuvering means (44A, 44B, 52; 86A, 86B) are, in general, symmetric with respect to the axis of articulation (X).

9. The articulation as claimed in claim 7, wherein the levers (34a, 34b) comprise closely adjacent ends (36A, 36B) joined together by elastic pins (68a, 68b) urging these adjacent ends into the position in which they are secured to the associated cheeks (24, 26).

10. The articulation as claimed in claim 7, wherein a spacing member (60) is interposed between rings (42a, 42b) and wherein the spacing member (60) also forms a member for synchronizing the levers (34a, 34b) and for that purpose comprises two diametrically opposed end forks (64a, 64b) intended to interact with shoulders (66A, 66B) for axial offsetting of the ends of the levers and with the interior contour of the levers when the latter are tilted.

11. The articulation as claimed in claim 1, wherein the maneuvering means comprise means (44A, 44B, 46A, 46B) for securing the ends (36A, 36B) of the lever to the associated cheeks (24, 26), and means (48a, 48b, 52) for tilting the lever (34a, 34b) between a position of rest, in which the two ends (36A, 36B) of the lever are secured to the two associated cheeks (24, 26) in order to couple these, and two alternative tilted positions, in which one end (36A, 36B) of the lever is secured to the associated cheek so that it bears against it, and the other end (36B, 36A) of the lever is freed of this cheek so as to allow the inclination of the backrest to be adjusted, or the backrest to the folded down temporarily.

12. The articulation as claimed in claim 11, wherein the means for securing the ends (36A, 36B) of the lever comprise a rotary bearing cam (44A, 44B) associated with each end (36A, 36B) of the lever, returned elastically into contact with a bearing cam follower (46A, 46B) integral with the end of the lever so as to keep this end secured to the associated cheek (24, 26), and wherein the means for tilting the lever comprise means (48a, 48b, 52) for disengaging the bearing cam associated with the end (36A, 36B) to be freed of the lever, opposing the elastic return force of this bearing cam, and means (44A, 44B; 86A, 86B) for pushing the bearing end (36B, 36A) of the lever.

13. The articulation as claimed in claim 12, wherein each end (36A, 36B) of the lever comprises a tilt-limiting stop (56A, 56B; 80A, 80B) intended to interact with a complementary stop (58A, 58B; 84A, 84B) integral with the bearing cam (44A, 4 LB) associated with each end (36A, 36B) of the lever.

14. The articulation as claimed in claim 12, wherein the means for pushing a bearing end (36A, 36B) of the lever comprise the bearing cam (44A, 44B) associated with this bearing end interacting with the bearing cam follower (46A, 46B) integral with this same end.

15. The articulation as claimed in claim 12, wherein the means for pushing a bearing end (36A, 36B) of the lever comprise a pushing cam (86A, 86B) integral with the bearing cam (44B, 44A) associated with the end (36B, 36A) to be freed of the lever, interacting with a pushing cam follower (80A, 80B) integral with the bearing end (36A, 36B) of the lever.

16. The articulation as claimed in claim 15, wherein each end (36A, 36B) of the lever includes a cam (88A, 88B) for angularly offsetting the bearing cam (44B, 44A) associated with the other end (36B, 36A) of the lever in a direction for disengaging this bearing cam, this angular-offsetting cam (88A, 88B) interacting with an angular-offsetting cam follower (90A, 90B) integral with this bearing cam (44B, 44A) when the end (36A, 36B) of the lever is freed from its associated cheek.

17. The articulation as claimed in claim 12, wherein the lever (34a, 34b) has the overall shape of an arc extending substantially parallel to the cheeks (24, 26), the ends (36A, 36B) of the lever being offset from one another parallel to the axis of articulation (X), the complementary securing shapes (SA, SB, TA, TB) being made on the exterior contours of the lever and on the interior contours of peripheral shoulders (38, 40) made in the cheeks (24, 26) and offset one with respect to the other parallel to the axis of articulation X, wherein the bearing cams (44A, 44B) are delimited by bosses made on the exterior contour of rotary rings (42a, 42b) associated with each end of the lever, centered substantially on the axis of articulation (X) and superimposed along this axis, the bearing cam followers (46A, 46B) being made on the interior contour of the lever (34a, 34b), and wherein the means for disengaging the bearing cams comprise a disengaging cam (52) mounted so that it can rotate around the axis of articulation (X) and intended to interact selectively with two disengaging cam followers (48a, 48b) made on the internal contour of the two rings (42a, 42b) respectively, the disengaging cam (52) being interposed between the disengaging cam followers (48a, 48b), preferably with angular clearance on each side of this cam (52).

18. The articulation as claimed in claim 17, wherein the disengaging cam followers are delimited by studs (48a, 48b) for catching on an angular-action return spring (50) urging the rings (42a, 42b) in opposite directions towards positions in which the bearing cams (44A, 44B) and bearing cam followers (46A, 46B) interact.

19. The articulation as claimed in claim 17, wherein the means for pushing a bearing end (36A, 36B) of the lever comprise the bearing cam (44A, 44B) associated with this bearing end interacting with the bearing cam follower (46A, 46B) integral with this same end and wherein the means for pushing a bearing end (36A, 36B) of the lever additionally comprise cams (54a, 54b) for an offset driving of the rings (42a, 42b), integral with the disengaging cam (52) extending angularly on each side of this disengaging cam so that each disengaging cam follower (48a, 48b) extends between the disengaging cam (52) and an offset-driving cam (54a, 54b) with an angular clearance which, as the disengaging cam and driving cam are rotated, allows offset driving of the disengaging cam followers (48a, 48b) which first of all causes the disengagement of the bearing cam (44B, 44A) associated with the end (36B, 36A) to be freed of the lever, then causes the bearing end (36A, 36B) of the lever to be pushed.

20. The articulation as claimed in claim 17, wherein the cheeks (24, 26) and the rings (42a, 42b) are centered with respect to each other by complementary circular shoulders (E3 to E8) made in these elements, substantially coaxial with the axis of articulation (X).

21. The articulation as claimed in claim 17, wherein a spacing member (60) is interposed between the rings (42a, 42b).

22. The articulation as claimed in claim 17, which comprises means (76a, 76b) for limiting the travel for adjusting the inclination of the backrest, and means (70a, 70b, 72) for limiting travel for temporarily folding the backrest down, wherein the coupling means comprise two levers (34a, 34b), wherein the cheeks (24, 26) have the overall shape of a circle and are centered one with respect to the other by complementary peripheral shoulders (E1, E2) coaxial with the axis of articulation (X) and wherein the means for limiting the travel for adjusting the inclination of the backrest comprise a backrest inclination limiting stop (76a, 76b) integral with the mobile cheek (26) intended to interact with two complementary end-of-travel stops delimited, one by a shoulder (66A) for axial offsetting of the two ends (36A, 36B) of a first lever (34a), and the other by the end (363) of the second lever (34b) associated with the mobile cheek (26).

23. The articulation as claimed in claim 17, wherein each end (36A, 36B) of the lever comprises a tilt-limiting stop (56A, 56B; 80A, 80B) intended to interact with complementary stop (58A, 58B; 84A, 84B) integral with the bearing cam (44A, 44B) associated with each end (36A, 36B) of the lever, wherein the tilt-limiting stop (58A, 58B) associated with one end (36A, 36B) of the lever is integral with the bearing cam (44A, 44B) associated with this end of the lever, and wherein the tilt-limiting stops (56A, 56B) are delimited by end bosses made on the interior contour of the lever (34a, 34b) and the complementary tilt-limiting stops (58A, 58B) are delimited by cutouts made on the exterior contour of the rings (42a, 42b).

24. The articulation as claimed in claim 23, wherein on each ring (42a, 42b), a cutout (58A; 84A) forming a complementary stop limiting the tilting of the lever is filled in with the purpose of preventing of this lever from tilting into its position which allows the backrest to be folded down temporarily.

25. The articulation as claimed in claim 17, wherein each end (36A, 36B) of the lever comprises a tilt-limiting stop (56A, 56B; 80A, 80B) intended to interact with a complementary stop (58A, 58B; 84A, 84B) integral with the bearing cam (44A, 44B) associated with each end (36A, 36B) of the lever, wherein the means for pushing a bearing end (36A, 36B) of the lever comprise a pushing cam (86A, 86B) integral with the bearing cam (44B, 44A) associated with the end (36B, 36A) to be freed of the lever, interacting with a pushing cam follower (80A, 80B) integral with the bearing end (36A, 36B) of the lever, wherein the complementary tilt-limiting stop (84A, 84B) associated with one end (36A, 36B) of the lever is integral with the bearing cam (44B, 44A) associated with the other end (36B, 36A) of the lever, wherein the tilt-limiting stops are delimited by fingers (80A, 80B) borne by logs (82A, 82B) extending the ends (36A, 36B) of the levers substantially radially inwards, and the complementary tilt-limiting stops (84A, 84B) are delimited by tilt-limiting cutouts made on the exterior contour of the rings (42b, 42a), each finger (80A, 80B) extending parallel to the axis of articulation (X) so as to take up an axial offset between the end (36A, 36B) of the lever bearing it and the other end (36B, 36A) of this lever, and wherein the pushing cams (86A, 86B) are delimited by bosses made on the exterior contour of the rings (42b, 42a) and the pushing cam followers are delimited by the axial fingers (80A, 80B).

26. The articulation as claimed in claim 25, wherein each end (36A, 36B) of the lever includes a cam (88A, 88B) for angularly offsetting the bearing cam (44B, 44A) associated with the other end (36B, 36A) of the lever in the direction for disengaging this bearing cam, this angular-offsetting cam (88A, 88B) interacting with an angular-offsetting cam follower (90A, 90B) integral with this bearing cam (44B, 44A) when the end (36A, 36B) of the lever is freed from its associated cheek and wherein the angular-offsetting cams (88A, 88B) are delimited by portions of the contour of the axial fingers (80A, 808) forming first ramps, and the angular-offsetting cam followers (90A, 90B) are delimited by portions of the contour of the tilt-limiting cutouts (84A, 84B) forming second ramps which complement the first ramps.

27. The articulation as claimed in claim 17, wherein the complementary shapes (SA, SB, TA, TB) for securing the ends (36A, 36B) of the lever to the cheeks (24, 26) comprise complementary toothings and wherein each end (36A, 36B) of the lever comprises a toothed securing sector (SA, SB), the toothed sector (SA) of a first end (36A) of the lever being intended to interact with a toothed sector of like angle (TA) of the stationary cheek (24), and the toothed sector (SB) of the second end (36B) of the lever being intended to interact with a toothed sector (TB) of larger angle of the mobile cheek (26).

28. The articulation as claimed in claim 27, wherein the toothed sector (TB) of the mobile cheek (26) forms an annulus gear.

29. The articulation as claimed in claim 27, wherein the opposite ends of the toothed sectors (SA, SB) of the lever comprise toothed regions (ZA, ZB) for reinforcing the bearing of the lever, one or other of these regions interacting with the toothed sector (TA, TB) of the associated cheek only when the lever is in one of two tilted positions or the other.

* * * * *